US012696001B2

(12) United States Patent
Christiansen et al.

(10) Patent No.: US 12,696,001 B2
(45) Date of Patent: Jul. 28, 2026

(54) CAMERA SYSTEM AND METHOD FOR GENERATING A COMBINED IMAGE PROJECTION

(71) Applicant: AGCO International GmbH, Neuhausen (CH)

(72) Inventors: Martin Peter Christiansen, Randers (DK); Morten Stigaard Laursen, Randers (DK); Filip Slezák, Randers (DK)

(73) Assignee: AGCO International GmbH, Neuhausen (CH)

( * ) Notice: Subject to any disclaimer, the term of this patent is extended or adjusted under 35 U.S.C. 154(b) by 168 days.

(21) Appl. No.: 18/600,367

(22) Filed: Mar. 8, 2024

(65) Prior Publication Data

US 2024/0340545 A1 Oct. 10, 2024

(30) Foreign Application Priority Data

Apr. 4, 2023 (GB) ..................................... 2305023

(51) Int. Cl.
| | |
|---|---|
| *H04N 23/951* | (2023.01) |
| *B60R 1/27* | (2022.01) |
| *B60R 1/31* | (2022.01) |
| *H04N 13/156* | (2018.01) |
| *H04N 23/90* | (2023.01) |

(52) U.S. Cl.
CPC ............. *H04N 23/951* (2023.01); *B60R 1/27* (2022.01); *B60R 1/31* (2022.01); *H04N 13/156* (2018.05); *H04N 23/90* (2023.01); *B60R 2300/105* (2013.01); *B60R 2300/303* (2013.01)

(58) Field of Classification Search
CPC ....... B60R 1/27; B60R 1/31; B60R 2300/105; B60R 2300/303; G06T 3/4038; G06T 7/30; G06T 7/33; H04N 13/156; H04N 23/951; H04N 23/90
See application file for complete search history.

(56) References Cited

U.S. PATENT DOCUMENTS

| | | | |
|---|---|---|---|
| 7,307,655 | B1 | 12/2007 | Okamoto et al. |
| 10,354,155 | B2 | 7/2019 | Fürsich |
| 10,523,865 | B2 | 12/2019 | Appia et al. |
| 11,155,211 | B2 | 10/2021 | Lynam |
| 11,463,674 | B1 * | 10/2022 | Ollila ..................... H04N 23/58 |

(Continued)

OTHER PUBLICATIONS

UK Intellectual Property Office, Search report for related UK Application No. GB2305023.0, dated Oct. 11, 2023, 3 pages.

*Primary Examiner* — Kee M Tung
*Assistant Examiner* — Thang Gia Huynh

(57) ABSTRACT

A method and a camera system for generating a combined image projection includes a control unit configured to carry out the method including the steps of capturing a first and a second image of an object by a first and a second camera generating a first and a second image projection of the captured images, finding an image content being contained in both image projections, overlapping the first and second image projections, determining a resolution value for each of two overlapping pixels in an overlapped area and combining the first and the second image projection so that the pixel of the two overlapping pixels having the higher resolution value is included in a combined image projection.

19 Claims, 6 Drawing Sheets

(56)                    References Cited

U.S. PATENT DOCUMENTS

| | | | |
|---|---|---|---|
| 2018/0232851 A1 | 8/2018 | Scholl et al. | |
| 2019/0096090 A1* | 3/2019 | Hirai .......................... | G06T 7/80 |
| 2020/0396394 A1 | 12/2020 | Zlokolica et al. | |
| 2021/0016709 A1 | 1/2021 | Ihlenburg et al. | |
| 2021/0350162 A1* | 11/2021 | Miller ................. | G05D 1/0094 |
| 2022/0207756 A1 | 6/2022 | Ren et al. | |
| 2022/0329731 A1* | 10/2022 | Park ....................... | H04N 23/90 |

* cited by examiner

CAMERA SYSTEM AND METHOD FOR GENERATING A COMBINED IMAGE PROJECTION

FIELD

The present disclosure relates generally to a generation of a combined image projection based on two images captured by two cameras.

BACKGROUND

Autonomously operated vehicles, as for example used in agriculture or construction, may process image data of their vicinity as a basis for automatic decisions how to automatically control the vehicle. The image data may provide a track along which the vehicle may be guided or obstacles which should be avoided by the vehicle to prevent a collision. The image data may also be used to control an implement connected with the vehicle, for example to execute a task in an agricultural field. The image data can be captured by two or more cameras mounted at the vehicle. The image data of the different cameras can be stitched together to generate a combined image projection in terms of a closed surround view of the vicinity of the vehicle so that the area around the vehicle can be surveilled gapless.

U.S. Pat. No. 7,307,655 B1 discloses a vehicle with three cameras attached to the roof. The cameras monitor the surroundings of the vehicle. Each pixel constituting an input image from a camera of the car is mapped onto a plane of a space model by mapping means. An image captured by a camera installed at the virtual point of view may be synthesized from a result mapped onto the plane. An image captured by a camera of which the attachment position and the attachment angle of which are previously known may be projected onto the road surface as an example of a plane constituting a part of the three-dimensional space.

BRIEF SUMMARY

The image data used as a basis for an autonomous operation of a vehicle needs to be of a sufficient quality to determine the correct decisions for the automatic control of the vehicle or the implement connected with the vehicle. But the generation of a combined image projection may reduce the quality of the image due to resolution losses. Thus, it is an objective to generate a combined image projection having of an improved image quality.

According to an aspect of the invention there is provided a method of generating a combined image projection, comprising the steps of capturing a first image of an object by a first camera, capturing a second image of the object by a second camera, generating a first image projection of the first image, generating a second image projection of the second image, finding an image content of the first and second image projection being contained in both image projections, overlapping the first and second image projections wherein the image content contained in both image projections matches together in an overlapped area, determining a resolution value for each of two overlapping pixels of the overlapped area, combining the first and the second image projection to a combined image projection, wherein the pixel of the two overlapping pixels having the higher resolution value is included in the combined image projection.

The camera system may be mounted on a vehicle, for example on top of an agricultural vehicle such as a tractor, a harvester, a sprayer or a combine. The pose of the first and the second camera of the camera system may be adapted for an optimal surveillance of the vicinity of the vehicle, for example to generate a closed surround view around the vehicle. Due to the individual pose of each camera, the perspective of the images captured by the first camera may be different to the perspective of the images captured by the second camera. But the perspectives of the images of the first and second camera may be equalized by the generation of the first and second image projections so that the combination of the first and second image projections result in a harmonized perspective of the combined image projection. For example, the first and second image projections may be projected to a common projection surface, as for example a ground the vehicle is moving on.

The generation of the first and second image projection may result in skewed images with varying resolution per pixel. So, the quality of the first and second image projections may be lower than the quality of the first or second images as originally captured by the camera system. But a loss of image quality of one of the image projections can be compensated by the other image projection. Within the overlapped area, there is for each pixel provided by the first image projection a corresponding pixel provided by the second image projection. I. e., the resolution value of the pixel provided by the first image projection may be compared with the resolution value of the corresponding pixel provided by the second image projection to determine the pixel of the two pixels having the higher resolution value. Consequently, the pixel having the higher resolution value may be used for the generation of the combined image projection to improve the image quality.

The first or the second image projection may be a planar projection.

Thus, the first and the second image projections can be optimally projected to a projection surface such as for example a ground. Nevertheless, other types of projections may be used as for example a cylindrical projection. The type of the projection to be applied may depend on the profile of the projection surface or other circumstances.

The method may comprise the step of determining pixels in the first or second image representing a projection surface.

Then, the projection surface can be distinguished from other objects contained in the first or second image to ensure that the first and second image projection are projected to the projection surface and not to other objects.

The method may comprise the step of determining distances of the first and second camera to the projection surface.

The distances of the first and second camera to the projection surface may be a known value. For example, the camera system may be mounted on top of the vehicle having a known height. Alternatively, the first or the second camera may be configured to determine the distances, for example in case of a 3D camera providing depth information.

The pixels representing the projection surface may be determined based on depth information of the pixels.

The depth information of the pixels may be compared with the distances of the first and second camera to the projection surface. If the depth information of a pixel corresponds to the distance to the projection surface it can be assumed that the pixel represents the projection surface instead of another object. Optionally, the depth information of the pixels may be determined by artificial intelligence or a neuronal network trained for depth determination.

The pixels representing the projection surface may be determined based on color information of the pixels.

Alternatively or additionally to the depth information, the pixels representing the projection surface may be identified by its color information. For example, the color of the projection surface may be known so that a comparison of the color information is rather simple. Alternatively, specific color spaces such as gray or brown color shades being rather common for grounds can be assumed to represent the projection surface and to distinguish the projection surface from other objects.

The method may comprise the step of determining an orientation of the projection surface based on an orientation of the first and/or second camera.

The orientation of the first and/or second camera may depend on an orientation of the camera system which itself may depend on an orientation of the vehicle. I. e. the orientation of the cameras or of the camera system may change when the orientation of the vehicle changes. Additionally, the orientation of the projection surface in respect of the camera system changes when the orientation of the camera system changes. But a change of the orientation may be compensated. The orientation of the camera system or the vehicle may be determined by an inertial measurement unit (IMU) integrated in the camera system or in the vehicle. The information about the orientation provided the IMU may be processed, for example by a control unit, to update the projection surface based on the orientation of the camera system or the vehicle.

The method may comprise the step of orienting the first and second image projections to bring the image content contained in the first image projection into alignment with the image content contained in the second image projection.

Since the poses of the first and the second camera may be oriented differently the orientations of the first and second image projections may also be different. Thus, the first and second image projections may be aligned to each other at least within the overlapped area so that the first and second image projections match within the overlapped area and can be stitched to a combined image projection.

The first image or the second image may be an equidistant image.

Equidistant images may be captured by a camera comprising a fish-eye lens. An equidistant image enables for preserving angular sizes of an object on an image plane.

The image content contained in both image projections may comprise at least two pixels.

A first pixel of the common image content provided by the first image projection may correspond to a first pixel of the common image content provided by the second image projection. Analogously, a second pixel of the common image content provided by the first image projection may correspond to a second pixel of the common image content provided by the second image projection. Thus, the first image projection and the second image projection can be aligned to each other by overlapping the first pixel of the first image projection with the corresponding first pixel of the second image projection and by overlapping the second pixel of the first image projection with the corresponding second pixel of the second image projection.

The image content contained in both image projections may comprise the object, wherein the object may be a reference marker for overlapping the first and second image projections.

The reference marker may be fixed to the projection surface. The reference marker may comprise a known shape and/or a known marking for distinguishing the marker easily from other objects. The orientation of the reference marker may be known for determining easily an orientation of the projection surface. Thus, the reference marker may be used to calibrate the camera system on the one hand and to bring the first image projection into alignment with the second image projection for generating the combined image projection on the other hand.

The method may comprise the steps of determining a first distribution of resolution values of the first image projection within the overlapped area, and determining a second distribution of resolution values of the second image projection within the overlapped area.

The first distribution of resolution values may assign to each pixel of the first image projection within the overlapped area a resolution value. Analogously, the second distribution of resolution values may assign to each pixel of the second image projection within the overlapped area a resolution value. The first and the second distribution of resolution values may graphically be represented by a heat map diagram illustrating pixels of the same resolution value with the same coloring. The higher the resolution value may be the darker may be the coloring.

The method may comprise the step of comparing the first and the second distribution of resolution values.

The first distribution of resolution values may be compared with the second distribution of resolution values to determine which one of two corresponding pixels within the overlapped area provided by the first and second image projection has the higher resolution value. Then, the combined image projection can be generated with all pixels having the higher resolution value to increase the image quality.

The method may comprise the step of recognizing a change of the first or second distribution of resolution values.

The first or second distribution of resolution values may be compared with a previously determined first or second distribution of resolution values to determine a change in the first or second distribution of resolution values. When a change of the first or second distribution of resolution values has been determined the camera system may be recalibrated again. A change of the first or second distribution of resolution values may arise if a physical parameter of a camera changes, for example due to a different lens type or due to dirt on the lens.

The method may comprise the step of determining a movement of the first or second camera.

At least one of the cameras of the camera system may be moveable so that the pose and/or the position of the one camera in respect of the other camera may change. For example, one of the cameras may be attached to a moveable part of an implement connected with the vehicle or a moveable auger of a harvester. The movement may be determined by a corresponding sensor as for example a position sensor. Depending on the new pose or position of the camera the image projection of the corresponding camera may be adjusted accordingly.

The camera system may comprise more than two cameras. In this case, the combined image projection can be generated by processing the images captured by the additional cameras analogously according to the method as described above.

A further aspect provides a camera system for generating a combined image projection, comprising a first camera, a second camera, a control unit connected with the first and the second camera, wherein the control unit is configured to carry out the method described above.

As mentioned above, the camera system may be mounted on a vehicle, for example on top of an agricultural vehicle such as a tractor, a harvester, a sprayer or a combine. The first camera may be oriented in a front direction of the vehicle. The second camera may be oriented to a side direction of the vehicle. The camera system may comprise at least an additional camera, e. g. a third camera oriented in a side direction opposed to the second camera.

The first or the second camera may be of the type of a 2D-camera, a stereo camera or a time-of-flight (ToF) camera, for example. A ToF camera could provide depth information and improve accuracy of detection and pose estimation. Depending on the type of the camera, the first and the second camera may capture 2D or 3D images, gray-scale images, color images in any color space as for example in red-green-blue (RGB) color space, or multispectral images. The camera system may comprise more than two cameras to provide multiple views of the vicinity of the camera system and to improve the quality of the combined image projection.

The first or the second camera may also comprise a detector and a processing circuitry. The optical lens may collect and direct light from a field of view of the first or the second camera through a filter to the detector and serve to focus and/or magnify images. The detector may be a digital image sensor that converts electromagnetic energy to an electric signal and employs image sensing technology such as charge-coupled device (CCD) technology and/or complementary metal oxide semiconductor (CMOS) technology. The processing circuitry may include a circuitry for amplifying and processing the electric signal generated by the detector to generate image data, which is passed to the one or more computing devices such as the control unit.

The camera system may optionally comprise an external light source such as natural ambient light or an artificial light source. The light source may be configured and used specifically for capturing images with the first or the second camera. The light source may be a flashing lamp or a light emitting diode (LED) to improve image quality in low-light conditions such as during nighttime operations. The lamp could be an internal light source of the camera system that has been modified for this purpose.

Optionally, the camera system may execute monocular depth estimation algorithms to estimate depth information from a single camera image, for example to improve the detection of the projection surface.

The camera system may comprise a global navigation satellite system (GNSS) receiver providing a time stamp and a geo-reference for each image captured by the first and second camera. The data captured by the first and second camera is logged along with the position and time data gathered by the GNSS receiver allowing an accurate determination of the global position of objects contained in the captured images. An inertial measurement unit (IMU) included in the GNSS receiver could provide additional information about the orientation and movement of the camera system for improving the accuracy of the position estimation and the reference points of the GNSS receiver.

The first camera may comprise a fisheye lens or a rectilinear lens.

The first or the second camera may comprise an optical lens such as a standard pin-hole lens or a fish-eye lens, for example. The fish-eye lens may be of the type of a F-theta lens, a F-tan lens, a tailored distortion lens or a fovea lens, for example. Alternatively, at least one of the cameras may be equipped with a different type of a lens such as a rectilinear lens. The first or the second camera may comprise a color filter to better detect specific wavelengths, for example the wavelengths of the light reflected from the reference marker. The filter may pass selected spectral bands such as ultraviolet, infrared or other bands.

The first camera and the second camera may be of the same type.

I. e., both the first and the second camera may comprise the same physical parameters or the same optical properties. The first and second camera may have the same filter and/or lens.

The first camera may be relatively moveable in respect of the second camera.

Optionally, at least one of the cameras of the camera system may be moveable so that the pose and/or the position of the one camera in respect of the other camera may change. For example, one of the cameras may be attached to a moveable part of an implement connected with the vehicle or a moveable auger of a harvester. The movement may be determined by a corresponding sensor as for example a position sensor.

The camera system may comprise a reference marker.

The reference marker may be fixed to the projection surface. The reference marker may comprise a known shape and/or a known marking for distinguishing the marker easily from other objects. The orientation of the reference marker may be known for determining easily an orientation of the projection surface. Alternatively, the reference marker may be attached to the vehicle or an implement connected with the vehicle.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
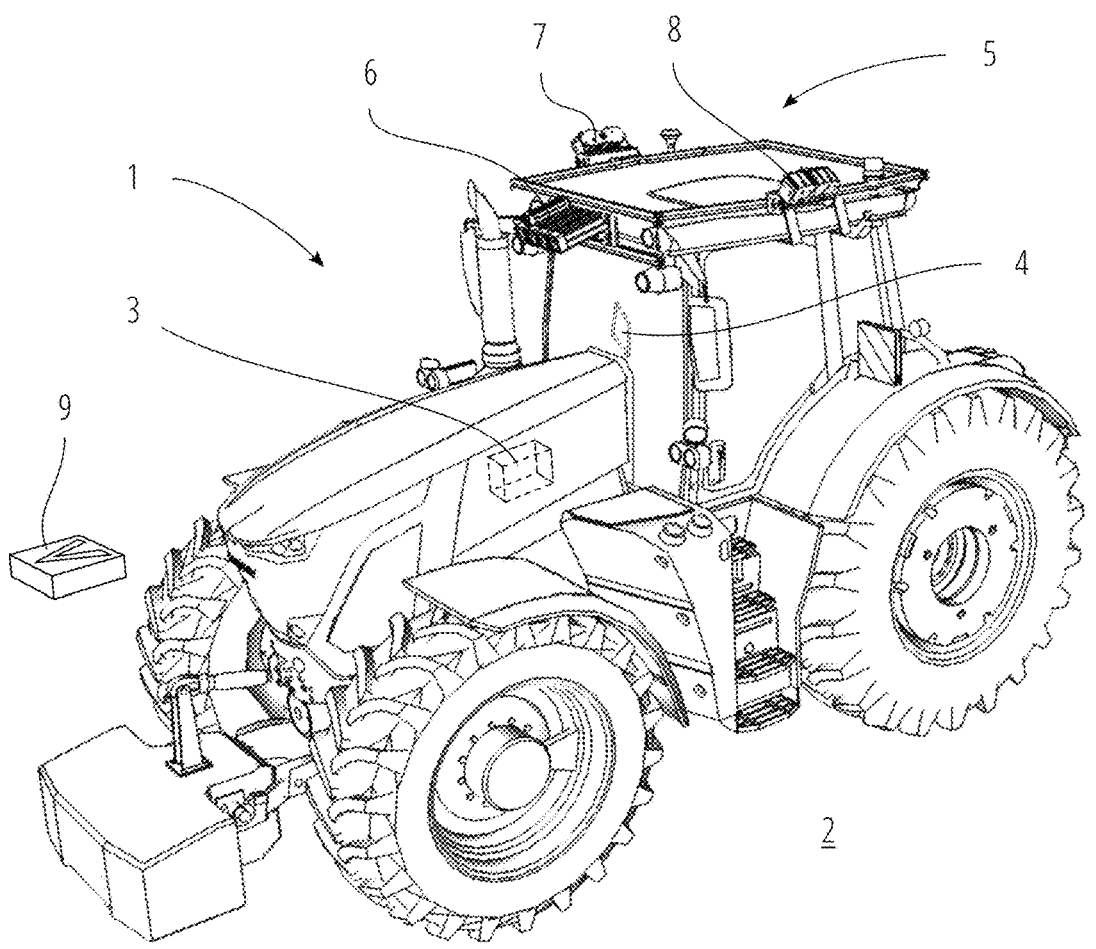
FIG. 1 illustrates an agricultural vehicle equipped with a camera system.

FIG. 1 shows a vehicle 1 located on a ground. The vehicle 1 is exemplarily shown as a tractor without limitation to that type of vehicle. I. e., the vehicle 1 could be of any other type such as a passenger car or a construction machine. The vehicle 1 comprises a control unit 3, a screen 4 and a camera system 5. The screen 4 and the camera system 5 is connected with the control unit 3 to exchange signals between all connected devices. For example, images captured by the camera system 5 can be sent to the control unit 3 and forwarded to the screen 4 for displaying them. The connection between the connected devices can be a wired or a wireless connection. The screen 4 can be removable and taken out of the vehicle 1. The screen 4 may comprise input elements, for example in terms of actuatable buttons and/or a graphical user interface, to control the vehicle 1 and the camera system 5. When the screen 4 is taken out of the vehicle 1, the camera system 5 may be controlled remotely by the screen 4.

The camera system 5 is mounted at the top of the vehicle 1, e. g. a cabin of the vehicle 1. The camera system 5 comprises at least one camera, for example a first camera 6, a second camera 7 and a third camera 8. Additional cameras may be integrated in the camera system 5. The cameras are each oriented in a different direction. The first camera 6 is oriented in a front direction of the vehicle 1, the second camera 7 in a right direction of the vehicle 1 and the third camera 8 in a left direction of the vehicle 1 opposed to the second camera 7. The pose of each camera 6 to 8 is directed to the ground to capture images of the vicinity of the vehicle 1. The position or the pose of each camera 6 to 8 may be adjusted automatically by the control unit 3 or manually by operating the input elements of the screen 4. For example, the position of the first camera 6 may be moved more to the left or more to the right side of the vehicle 1 or the pose of the first camera 6 may be oriented more downwards or more upwards in respect of the ground.

Depending on the type of the vehicle 1, the cameras 6 to 8 may be mounted at other locations of the vehicle 1. For example in case of a harvester, a camera may be attached to a moveable auger of the harvester. Alternatively, a camera may be attached to an implement connected with the vehicle 1.

An object 9 is located on the ground. The object 9 is designed as a reference marker comprising a known shape and/or a known marking detectable by each camera 6 to 8.

Figure 2:
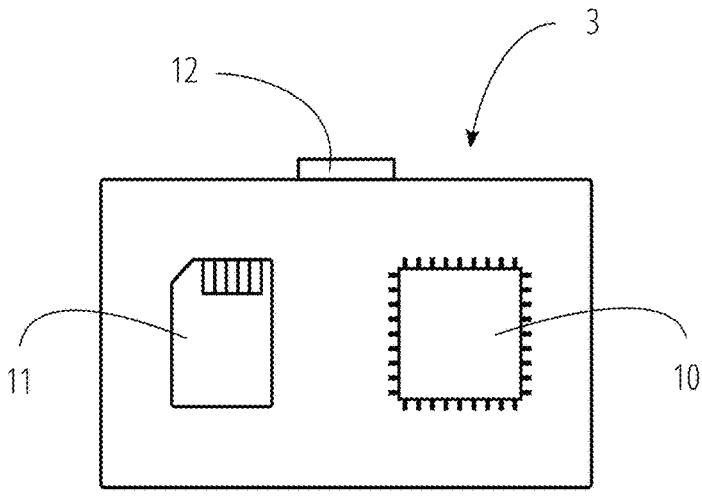
FIG. 2 illustrates a simplified view of a control unit of the vehicle shown in FIG. 2.

FIG. 2 shows the control unit 3 comprising an interface 12, a controller 10 and a memory 11. The control unit 3 may receive and send signals or data via the interface 12. The interface 12 may be a wireless interface or a connector. The camera system 5 and the screen 4 are connected with the interface 12. The controller 10 may store the data or signals received by the control unit 3 in the memory 11. The memory 11 may contain additional data or executable computer program products, for example in terms of a computer-implemented method, that may be retrieved, processed or carried out by the controller 10. For example, the memory 11 contains information about the position and the pose of each camera 6 to 8 of the camera system 5. The information may also contain a height information representing a distance between each camera 6 to 8 and the ground. The information may be entered into the memory 11 manually by the input elements of the screen 4 or automatically by the controller 10 executing a calibration method for the camera system 5. Data or signals resulting from the processing of data or signals or from the execution of a computer program product may be stored to the memory 11 or sent to the interface 12 by the controller 10.

The cameras 6 to 8 can be configured as stereo cameras to provide depth information of the captured image. Alternatively, the cameras 6 to 8 may be of a different type such as a 2D camera.

Figure 3:
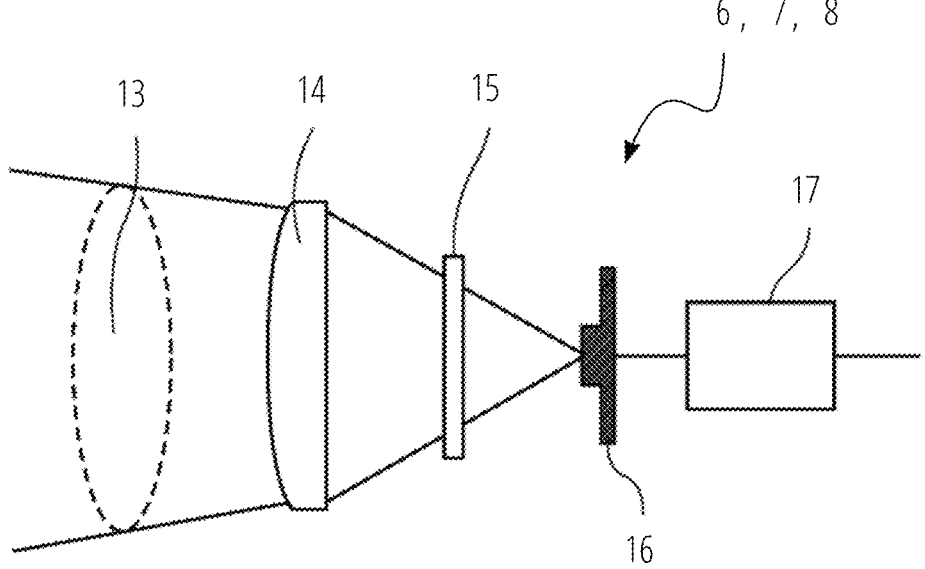
FIG. 3 illustrates a camera.

FIG. 3 shows exemplarily components of a camera, such as for example the first camera 6, the second camera 7 or the third camera 8 of the camera system 5. Each of the first to third cameras 6 to 8 may have an individual arrangement of the components. But optionally, the first to third cameras 6 to 8 may be of the same type.

A camera comprises at least one optical lens 14, an optional filter 15, a detector 16 and a processing circuitry 17. The optical lens 14 may collect and direct light from a field of view 13 of the camera through the filter 15 to the detector 16 and serve to focus and/or magnify images. The at least one optical lens 14 may be of the type of a fisheye lens, a rectilinear lens or any other standard and moderate wide-angle lens. A standard lens is typically defined as a lens with a focal length being approximately equal to the diagonal of the detector 16. This results in a field of view 13 that is rather similar to what human eyes see. Moderate wide-angle lenses have shorter focal lengths than standard lenses, typically ranging from 24 mm to 35 mm for full-frame cameras. These lenses offer a wider field of view 13 than standard lenses and can capture more of the scene in the frame. The optional filter 15 passes selected spectral bands such as ultraviolet, infrared or other bands. The detector 16 may be a digital image sensor that converts electromagnetic energy to an electric signal and employs image sensing technology such as charge-coupled device (CCD) technology and/or complementary metal oxide semiconductor (CMOS) technology. The processing circuitry 17 may include a circuitry for amplifying and processing the electric signal generated by the detector 16 to generate image data, which is passed to the one or more computing devices such as the control unit 3.

The images captured by the cameras 6 to 8 may contain at least a part of the vehicle 1. The cameras 6 to 8 share a projection surface 2. The projection surface 2 may be any surface or plane, as for example the ground on which the vehicle 1 is located.

Figure 4:
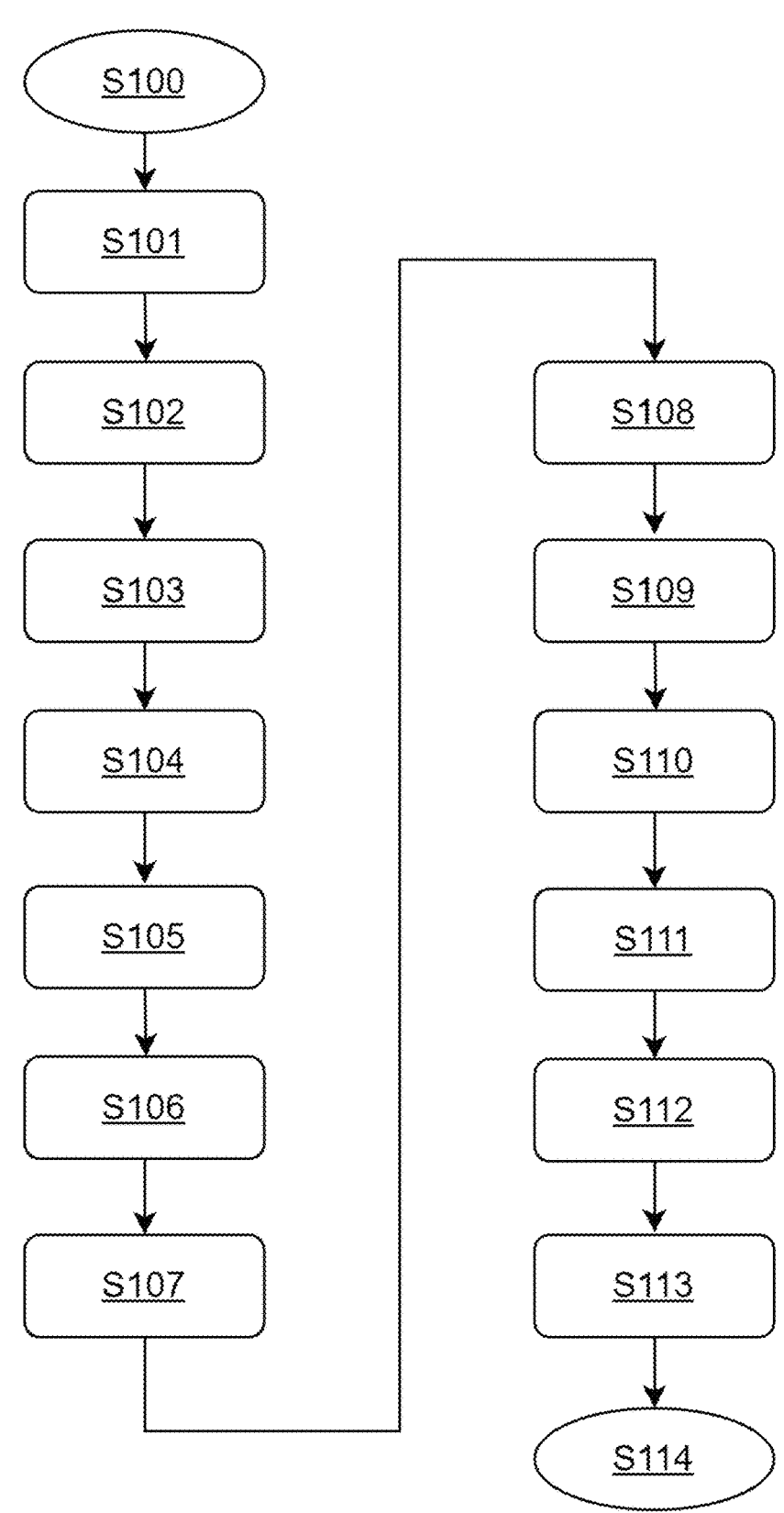
FIG. 4 illustrates a flow diagram for a method.

FIG. 4 shows a flow chart of a method for generating a combined image projection. The method may be a computer-implemented method stored as a computer program product in the memory 11 of the control unit 3. The control unit 3 is configured to carry out the method that may be executed by the controller 10. The method is described by way of example of several steps without any restriction in respect of that steps. I. e., the number or the order of steps may be adapted, for example single steps may be excluded and/or added and executed earlier or later than described.

The method starts with step S100 and proceeds to step S101 for calibrating the camera system 5. Step S101 is optional and may be executed by the control unit 3 if the camera system 5 has not been calibrated yet. Otherwise, calibration data may be already stored in the memory 11 of the control unit 3 and may be read out by the controller 10. The calibration can be used to determine intrinsic parameters and extrinsic parameters of the cameras of the camera system 5. The intrinsic parameters may comprise for example the center of projection, focal lengths and distortion coefficients while the extrinsic parameters will comprise the relative position of the cameras in relation to the ground. For calibrating the cameras, the camera system 5 will be positioned to a predefined position in relation to the object 9 used as a reference marker (see FIG. 1). The camera system 5 can be positioned by moving the vehicle 1 accordingly. The position of the reference marker is known by the control unit 3 and may be stored in the memory 11. The control unit 3 triggers the cameras of the camera system 5 to capture the reference marker. The triggering might be set up in way where the cameras capture images at the same time. The image data captured by the camera may comprise depth information to determine a distance between the camera and the reference marker. Alternatively, the camera system 5 comprises a sensor to determine a distance between the cameras and the reference marker. Based on the distance information and the known position of the reference marker and of the camera system 5, the control unit 3 determines the positions of the cameras, for example by means of triangulation for each camera. Additionally, the control unit 3 can also determine the pose of the cameras. The control unit 3 stores the determined positions and poses in the memory 11 for a later use. The intrinsic parameters as the focal length of the lens and center of projection of each camera can be stored in the memory 11 and read out by the controller 10 of the control unit 3.

The method proceeds to step S102 for capturing a first image of the object 9 by the first camera 6 and capturing a second image of the object 9 by a second camera 7. At step S102, the control unit 3 triggers the camera system 5 to capture the first image by the first camera 6 and the second image by the second camera 7. Both, the first image and the second image may be equidistant images, for example captured by cameras 6 and 7 comprising fish-eye lenses. The first and the second image contain the object 9. The control unit 3 may also trigger the third camera 8 to capture a third image. The control unit 3 receives the first image and the second image from the first and second camera 6 and 7 and may store them in the memory 11 for further processing. The third image may also be stored in the memory 11.

The method proceeds to step S103 and the control unit 3 analyzes the first and the second image for determining pixels in the first and the second image representing a projection surface 2 and the geometrical expression (definition) of such surface relative to the frame of reference of any of the cameras present in the system. The geometrical expression might be a continuous parameterized expression, that defines the three dimensional surface over the parameter space. As mentioned above, the projection surface 2 may be the ground on which the vehicle 1 is located. But the projection surface 2 can alternatively be any other plane or surface. For the case that the projection surface 2 correlates with the ground, the pixels representing the projection surface 2 and the expression defining the three dimensional surface over the parameter space may be determined based on the depth information of the captured first and second image. The control unit 3 compares the depth information of the first image with the information of the distance between the first camera 6 and the ground. If the depth information of a pixel of the first image corresponds to the information of the distance between the first camera 6 and the ground, the pixel can be assumed to represent the projection surface 2. Analogously, the control unit 3 compares depth information of the second image with the information of the distance between the second camera 7 and the ground to determine the pixels of the second image representing the projection surface 2.

The control unit 3 may also analyze the color information of the pixels of the first and second image to determine the projection surface 2. The color of the projection surface 2 can be considered to be of a specific coloring such as gray or brown shades. If the color information of one of the pixels of the first or second image correlates with the specific coloring the pixel can be assumed to represent the projection surface 2. For the case that the projection surface 2 is different to the ground, the control unit 3 considers another specific coloring matching with the color of the projection surface 2. Hence, the control unit 3 determines the pixels of the first and the second image representing the projection surface 2.

The method proceeds to step S104 and the control unit 3 determines the orientation of the projection surface 2 of the first image and the orientation of the projection surface 2 of the second image. The orientations of the first image and the second image depend on the orientations of the first camera 6 and the second camera 7. As can be seen in FIG. 1, the orientation of the second camera 7 is perpendicular to the first camera 6. Correspondingly, the orientation of the projection surface 2 shown in the second image is oriented perpendicular in respect of the orientation of the projection surface 2 shown in the first image.

The control unit 3 receives information of the extrinsic parameters of the first camera 6 and the second camera 7 to determine the orientations of the first and second camera 6 and 7. For example, a sensor of the camera system 5 senses the position and pose of the first or second camera 6 or 7 and sends the sensor signals to the control unit 3. If the orientation changes due to an adjustment of the pose (e. g. position and/or rotation) of the first or the second camera 6 or 7, the control unit 3 updates the information of the orientation of the first or second camera 6 or 7 for updating the orientations of the projection surface 2 of the first or second image accordingly.

Figure 5:
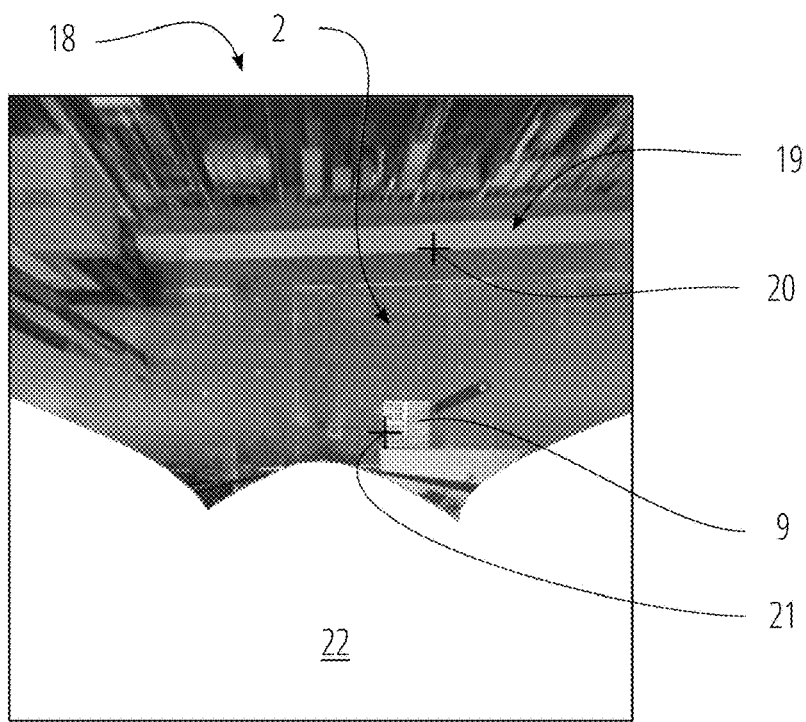
FIG. 5 illustrates a first image projection of a first image.
Figure 6:
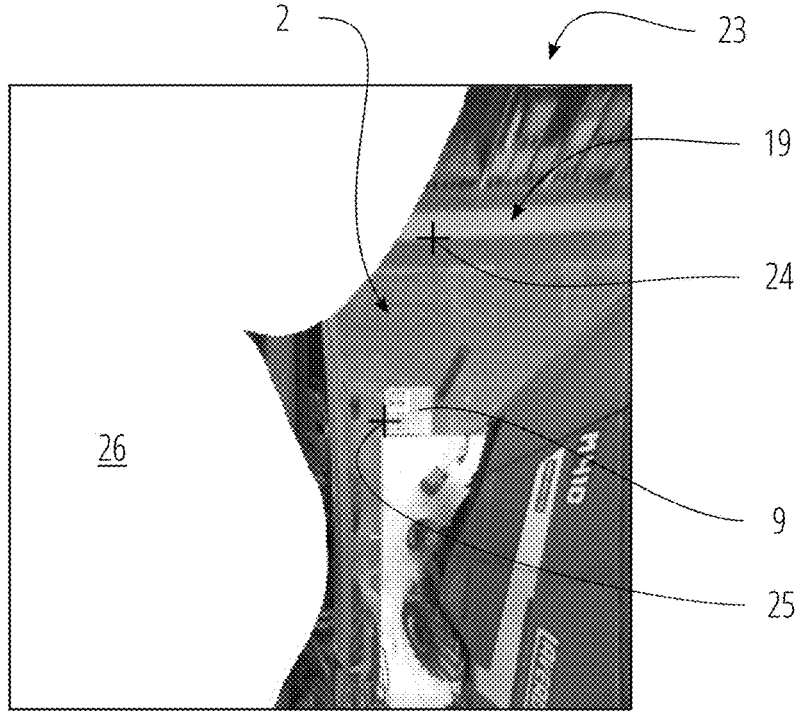
FIG. 6 illustrates a second image projection of a second image.

The method proceeds to step S105 and the control unit 3 generates a first image projection 18 of the first image as shown in FIG. 5 and a second image projection 23 of the second image as shown in FIG. 6 by projecting the first image and the second image to the projection surface 2. Under consideration of the pixels of the first and second image representing the projection surface 2 and the parameterized model of three dimensional projection surface, the control unit 3 projects the first and second image on the projection surface 2 that appears in the first and the second image projection 18 and 23 as a flat surface as can be seen in FIG. 5 and FIG. 6. Since the first image and the second image are projected to the same projection surface 2, the first image projection 18 and the second image projection 23 provide a harmonized perspective.

An area which has been out of view of a camera 6 to 8 when an image was captured is shown as an out-of-view area. For example, the first image projection 18 comprises an out-of-view area 22 and the second image projection 23 comprises an out-of-view area 26 both shown as white areas in FIG. 5 and FIG. 6.

Figure 7:
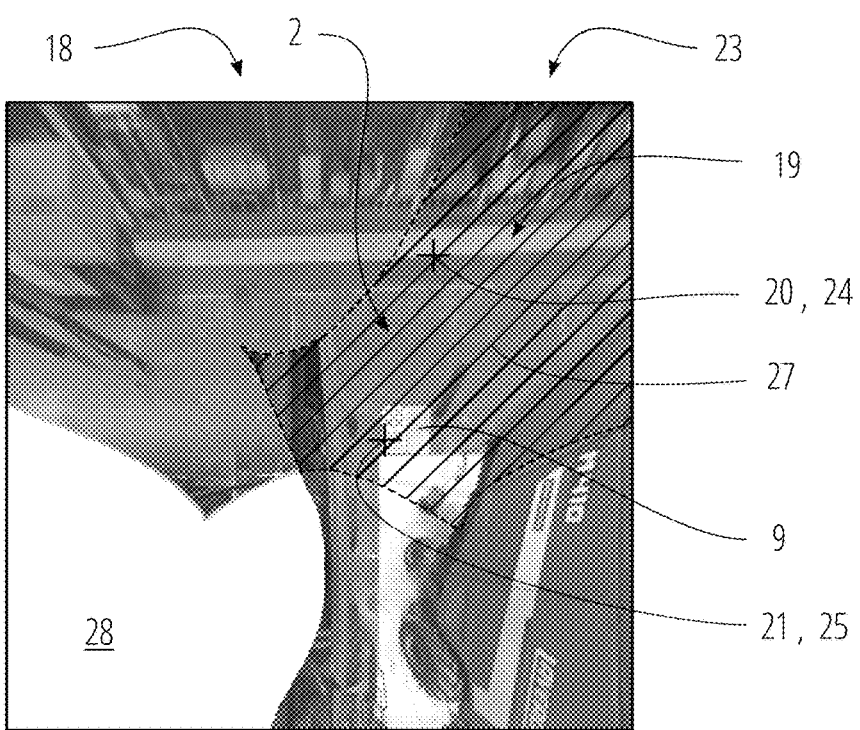
FIG. 7 illustrates the first and second image projection overlapping in an overlapped area.

The method proceeds to step S106 and the control unit 3 analyzes the first and the second image projection 18 and 23 to find a common image content 19 of the first and second image projection 18 and 23 being contained in both image projections 18 and 23. Based on the image content 19 contained in both image projections 18 and 23, the control unit 3 can determine an area of the first image projection 18 and an area of the second image projection 23 which can be overlapped and merged to combine the first and second image projections 18 and 23 to a combined image projection 29 (as shown in FIG. 7). The image content 19 may comprise the object 9.

The method proceeds to step S107 and the control unit 3 orients the first and second image projections 18 and 23 to bring the image content 19 contained in the first image projection 18 into alignment with the image content 19 contained in the second image projection 23. The orientation of the first and the second image projection 18 and 23 can be determined based on the determined orientations of the first and second camera 6 and 7 as described above. Alternatively, the orientations of the first and second image projection 18 and 23 can be determined based on the image content 19. For example, the control unit 3 analyzes the object 9 contained in the image content 19 of the first and second image projection 18 and 23. The object 9 can be used as a reference marker and may have a distinct characteristic such as a sharp shape indicating a specific orientation of the object 9 in the image content 19. Then, the control unit 3 orients the first and second image projection 18 and 23 so that the common image content 19 of the first and second image projection 18 and 23 have the same orientation and matches together when the first and second image projection 18 and 23 may be overlapped. I. e., the first and second image projection 18 and 23 are aligned to each other.

The method proceeds to step S108 and the control unit 3 overlaps the first and the second image projection 18 and 23 by overlapping the common image content 19 of the aligned first and the second image projection 18 and 23, as shown in FIG. 7. The common image content 19 of the first and the second image projection 18 and 23 are matched together and share an overlapped area 27 indicated by a hatched area in FIG. 7. Thereby, the control unit 3 overlaps each pixel contained in the overlapped area 27 of the first image projection 18 with a corresponding pixel contained in overlapped area 27 of the second image projection 23. For example, the first image projection comprises the pixels 20 and 21 within the overlapped area 27 (see FIG. 5 and FIG. 7) and the second image projection 23 comprises the pixels 24 and 25 within the overlapped area 27 (see FIG. 6 and FIG. 7). The control unit 3 overlaps pixel 20 of the first image projection 18 with pixel 24 of the second image projection 23 since the image content represented by pixel 20 corresponds to the image content represented by pixel 24. Analogously, the control unit 3 overlaps other pixels of the first and second image projection 18 and 23. For example, pixel 21 of the first image projection 18 is overlapped with pixel 25 of the second image projection 23 since the image content represented by pixel 21 corresponds to the image content represented by pixel 25.

The out-of-view area 22 of the first image projection 18 may be partly filled up with an image content of the second image projection 23 and the out-of-view area 26 of the second image projection 23 may be partly filled up with an image content of the first image projection 18 so that the out-of-view areas 22 and 26 of the first and second image projection 18 and 23 may result in a reduced out-of-view area 28 of the overlapping image projections 18 and 23 also shown as a white area in FIG. 7.

The method proceeds to step S109 and the control unit 3 determines a resolution value for each of the overlapping pixels of the overlapped area 27. The raw image captured by cameras is considered to have a homogeneous resolution throughout the entire image plane because the contribution of each pixel from a detector 16 of a camera is valued equally. When the raw image is projected on a surface, it can be thought of as a transformation or warping of the raw image. Given the shape of the surface and its relative pose to the camera that has captured an image of it, each pixel from the projection image would have been assigned a resolution value based on a combination (interpolation) of pixels from the raw image. As can exemplarily be seen in FIG. 10, some areas of the projected image which have a high resolution (for example where pixel 38 is located) would have been assigned resolution values based on interpolation of a greater area from the raw image as compared to an area having a lower resolution (for example where pixel 37 is located) which could use only a smaller area. As mathematically expressed by the mapping function H defined by formulas F1 and F2, the resolution value corresponds to the partial derivative of a motion perpendicular to the normal of the projection surface relative to its projection on the raw image plane:

$$H\left(^{world}P\right) = {}^{type\,of\,lens}x. \qquad \text{Formula F1}$$

$$\frac{\delta}{\delta^{world}x}H\left(^{world}P\right) = \text{resolution value.} \qquad \text{Formula F2}$$

Figure 9:
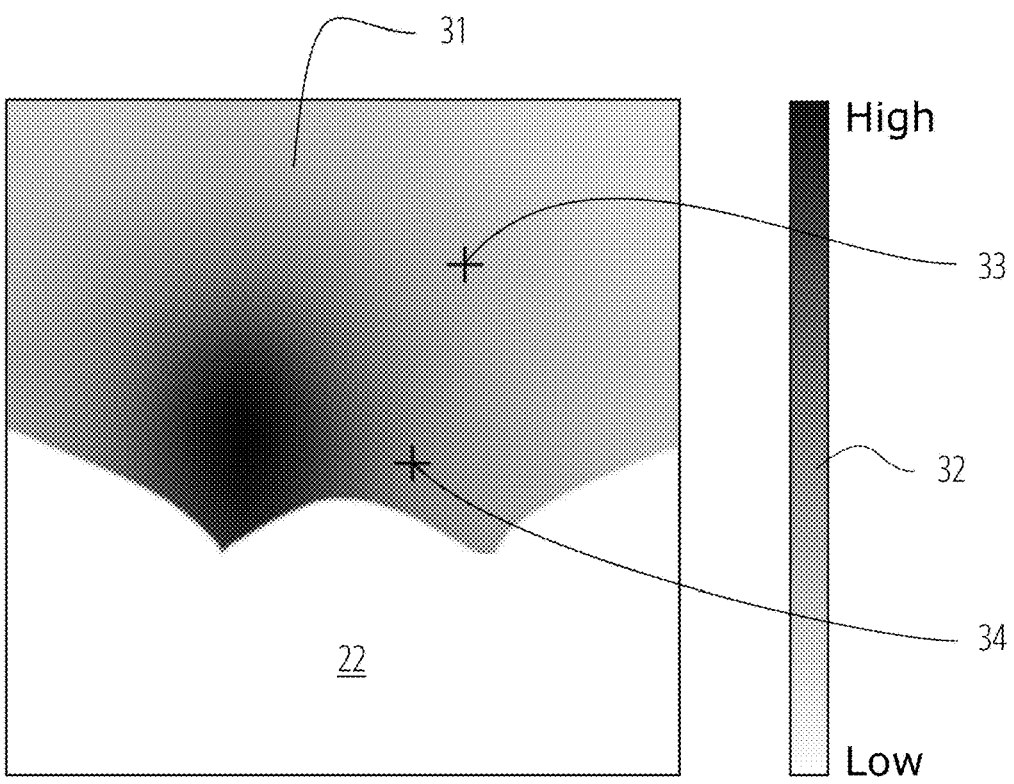
FIG. 9 illustrates a heat map for the first image projection.
Figure 10:
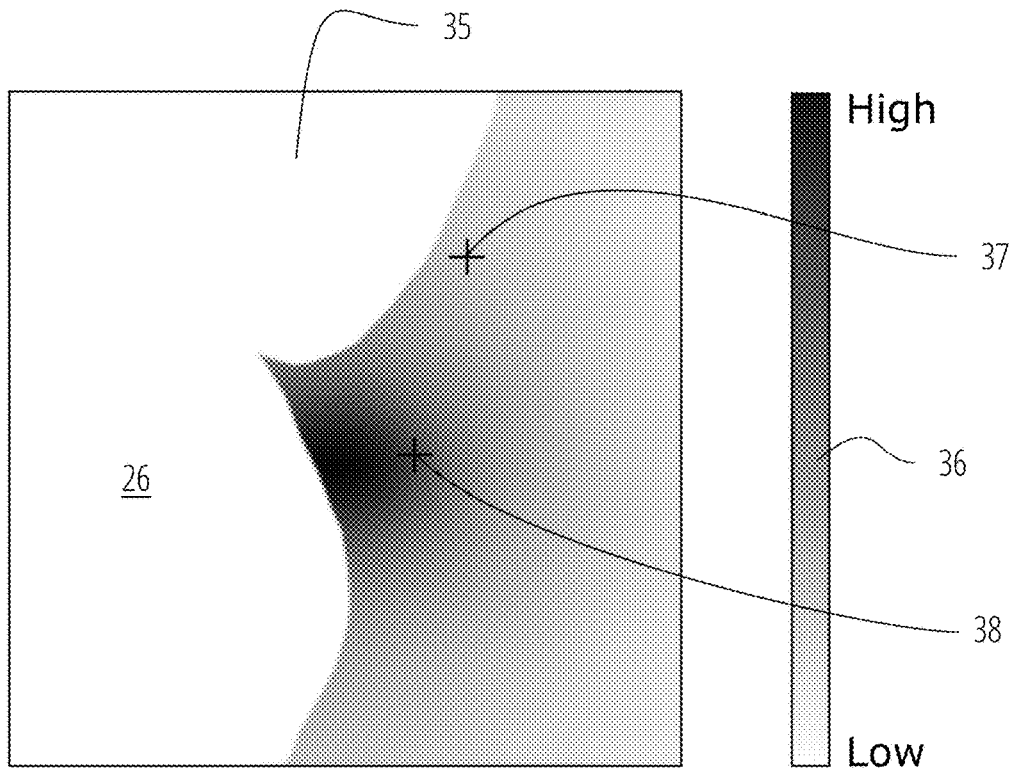
FIG. 10 illustrates a heat map for the second image projection.

The units are therefore px*1/m (pixels over meters). An intuitive explanation of the mathematical expression can be understood as how many pixels on the raw image plane correspond to the movement of one meter in the direction perpendicular to the normal of the surface. Therefore, the more pixels one meter of movement represents, the higher the resolution values. The essential aspects of determining the resolution values are the relative pose of the cameras and the projection surface, the mapping function H the camera uses, i. e. the lens type and the resolution values of the raw image captured by the cameras. Given these parameters, one can construct the mapping function H (from the equation in the picture) and take a partial derivative of it which will yield a resolution map as depicted in FIG. 9 and FIG. 10.

The control unit 3 determines a first distribution of resolution values comprising the resolution values of all overlapping pixels provided by the first image projection 18 and a second distribution of resolution values comprising the resolution values of all overlapping pixels provided by the second image projection 23. The first and the second distribution of resolution values may be stored in the memory 11 of the control unit 3, e. g. in terms if a table. The distribution of the resolution values of the pixels of the first image projection 18 may be graphically represented on the screen 4 in terms of a first heat map 31 as shown in FIG. 9 and the distribution of the resolution values of the pixels of the second image projection 23 may be graphically represented on the screen 4 in terms of a second heat map 35 as shown in FIG. 10. The area of the first heat map 31 corresponds to the area of the first image projection 18 having the same out-of-view area 22. The area of the second heat map 35 corresponds to the area of the second image projection 23 having the same out-of-view area 26. A legend 32 of the first heat map 31 defines a scale of the different resolution values varying between high and low. While in FIG. 9 and FIG. 10 these values vary between high and low for illustration purposes, the resolution values are real valued and the real value is dependent on intrinsic and extrinsic parameters of the cameras, allowing for direct comparison of any real cameras. The higher a resolution value of a pixel of the first image projection 18 is, the darker is the color of a corresponding pixel in the heat map 31. For example, pixel 33 of the first heat map 31 corresponds to pixel 20 of the first image projection 18 and defines the resolution value of pixel 20. Pixel 34 of the first heat map 31 corresponds to pixel 21 of the first image projection 18 and defines the resolution value of pixel 21. Analogously, a legend 36 of the second heat map 35 defines a scale of the different resolution values varying between high and low. The higher a resolution value of a pixel of the second image projection 23 is, the darker is the color of a corresponding pixel in the second heat map 35. For example, pixel 37 of the second heat map 35 corresponds to pixel 24 of the second image projection 23 and defines the resolution value of pixel 24. Pixel 38 of the second heat map 35 corresponds to pixel 25 of the second image projection 23 and defines the resolution value of pixel 25.

Pixels of the out-of-view areas 22 and 26 have no or the lowest resolution value to avoid that these pixels will be preferred in contrast to pixels representing an image content.

The method proceeds to step S110 and the control unit 3 compares the first distribution of resolution values with the second distribution of resolution values to determine which one of two overlapping pixels of the overlapped area 27 has the higher resolution value. As mentioned above, pixel 20 of the first image projection 18 overlaps pixel 24 of the second image projection 23 and pixel 21 of the first image projection 18 overlaps pixel 25 of the second image projection 23. Thus, the control unit 3 compares the resolution values of the pixels 20 and 24 and the resolution values of the pixels 21 and 25. Analogously, the control unit 3 compares the resolution values of the other overlapping pixels of the overlapped area 27.

As a result of the comparison of the resolution values, the control unit 3 may exemplarily determine that the resolution value of the pixel 20 of the first image projection 18 is higher than the resolution value of the overlapping pixel 24 of the second image projection 23 and that the resolution value of the pixel 25 of the second image projection 23 is higher than the resolution value of the overlapping pixel 21 of the first image projection 18.

Figure 8:
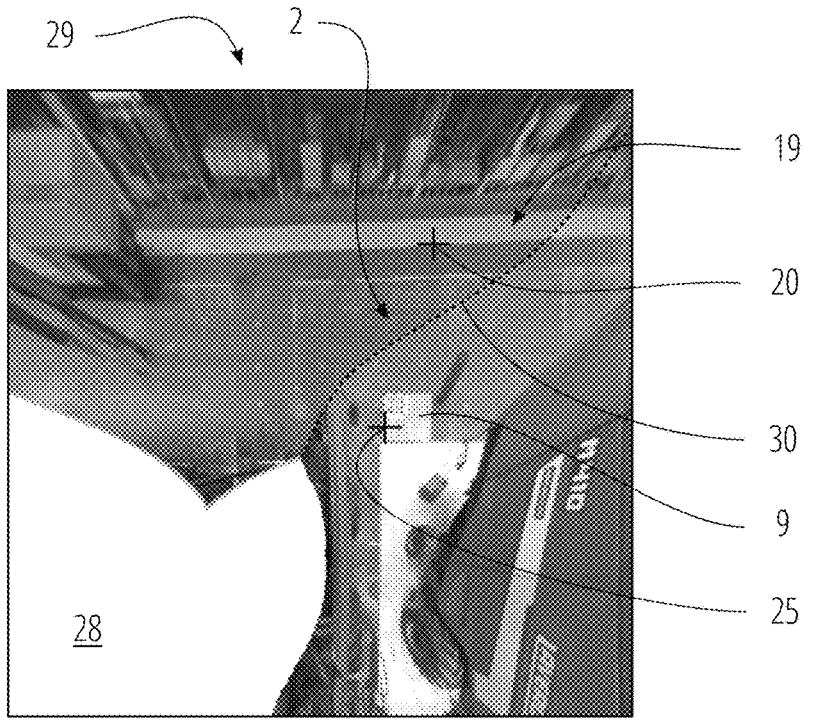
FIG. 8 illustrates a combined image projection with optimized resolution values.

The method proceeds to step S111 and the control unit 3 combines the first and the second image projection 18 and 23 to a combined image projection 29 as can be seen in FIG. 8. The control unit 3 generates the combined image projection 29 by including those pixels of two overlapping pixels having the higher resolution value. I. e., pixel 20 of the first image projection 18 and pixel 25 of the second image projection 23 are included in the combined image projection 29 but pixel 21 of the first image projection 18 and pixel 24 of the second image projection 23 are not included as can be seen in FIG. 8. Analogously, the control unit 3 includes the other pixels of the overlapped area 27 having the higher resolution value in the combined image projection 29. Finally, the combined image projection 29 is generated by pixels of the first and second image projection 18 and 23 each having the higher resolution value to improve the image quality of the combined image projection 29.

Since pixels of the first image projection 18 and pixels of the second image projection 23 are included in the combined image projection 29, some pixels of the first image projection 18 adjoin to pixels of the second image projection 23. Between those pixels, a discrimination line 30 can be determined by the control unit 3 to indicate which pixels of the combined image projection 29 are provided by the first image projection 18 and which pixels by the second image projection 23. The discrimination line 30 may be displayed on the screen 4.

The control unit 3 may analogously apply the method steps S103 to steps S111 to include additionally a third image projection of a third image captured by the third camera 8 in the combined image projection 29. The third image projection can be determined analogously to the first or second image projection 18 or 23 as well as an overlapped area with the first or second image projection 18 or 23. The control unit 3 may analogously determine resolution values of the pixels of the third image projection and compare them with resolution values of pixels of the first or second image projection 18 or 23.

The method proceeds to step S112 and the control unit 3 recognizes a change in the first or second distribution of resolution values. For example, the control unit 3 compares the first distribution of resolution values with a previously determined first distribution of resolution values. If the first distribution of resolution values differs from the previously determined distribution of resolution values, a change in the first distribution of resolution values is detected by the control unit 3. A change in the first or second distribution of resolution values may exemplarily arise if a physical parameter of one of the cameras has been changed.

The method proceeds to step S113 and the control unit 3 determines a movement of the first or second camera 6 or 7. As explained above, at least one of the cameras may be moveable in respect of the pose or the position of the camera. The at least one camera may move within the camera system 5 and may be moveable in respect of the other camera of the camera system 5. The camera may be mounted on a moveable arm such as an auger of a harvester. The change of the pose (e. g. position and/or orientation) of the camera may be measured by a sensor such as an encoder. The signals generated by the encoder can be transmitted to the control unit 3 so that the control unit 3 can determine the current pose and position of the at least one camera. Since an amended pose or position of the at least one camera may require an updated generation of a combined image projection 29, the method may step back to step S101 or S102 to repeat the method steps for generating a combined image projection 29.

Finally, the method proceeds to step S114 and ends. The method may be restarted again by executing the step S100.

All references cited herein are incorporated herein in their entireties. If there is a conflict between definitions herein and in an incorporated reference, the definition herein shall control.

LISTING OF DRAWING ELEMENTS

1 vehicle
2 projection surface
3 control unit
4 screen
5 camera system
6 first camera
7 second camera
8 third camera
9 object
10 controller
11 memory
12 interface
13 field of view
14 lens
15 filter
16 detector
17 processing circuitry
18 first image projection
19 image content
20 pixel
21 pixel
22 out-of-view area
23 second image projection
24 pixel
25 pixel
26 out-of-view area
27 overlapped area
28 out-of-view area
29 combined image projection
30 discrimination line
31 heat map
32 legend
33 pixel
34 pixel 35 heat map
36 legend
37 pixel
38 pixel

What is claimed is:

1. A method of generating a combined image projection, comprising:

capturing a first image of an object by a first camera;

capturing a second image of the object by a second camera;

generating a first image projection of the first image;

generating a second image projection of the second image;

finding an image content of the first and second image projection being contained in both image projections;

overlapping the first and second image projections wherein the image content contained in both image projections matches together in an overlapped area;

determining a resolution value for each of two overlapping pixels of the overlapped area;

combining the first and the second image projection to a combined image projection; and determining pixels in the first or second image representing a projection surface, wherein the pixel of the two overlapping pixels having the higher resolution value is included in the combined image projection, and wherein the pixels representing the projection surface are determined based on depth information of the pixels.

2. The method of claim 1, wherein the first or the second image projection is a planar projection.

3. The method of claim 1, further comprising:

determining pixels in the first or second image representing a projection surface.

4. The method of claim 3, further comprising:

determining distances of first and second camera to the projection surface.

5. The method of claim 3, further comprising:

determining an orientation of the projection surface based on an orientation of the first and/or second camera.

6. The method of claim 1, further comprising:

orienting the first and second image projections to bring the image content contained in the first image projection into alignment with the image content contained in the second image projection.

7. The method of claim 1, wherein the first image or the second image is an equidistant image.

8. The method of claim 1, wherein the image content contained in both image projections comprises at least two pixels.

9. The method of claim 1, wherein the image content contained in both image projections comprises the object; wherein the object is a reference marker for overlapping the first and second image projections.

10. The method of claim 1, further comprising:

determining a first distribution of resolution values of the first image projection within the overlapped area; and determining a second distribution of resolution values of the second image projection within the overlapped area.

11. The method of claim 10, further comprising:

comparing the first and the second distribution of resolution values.

12. The method of claim 10, further comprising:

recognizing a change of the first or second distribution of resolution values.

13. The method of claim 1, further comprising:

determining a movement of the first or second camera.

14. A method of generating a combined image projection, comprising:

capturing a first image of an object by a first camera;

capturing a second image of the object by a second camera;

generating a first image projection of the first image;

generating a second image projection of the second image;

finding an image content of the first and second image projection being contained in both image projections;

overlapping the first and second image projections wherein the image content contained in both image projections matches together in an overlapped area;

determining a resolution value for each of two overlapping pixels of the overlapped area;

combining the first and the second image projection to a combined image projection; and determining pixels in the first or second image representing a projection surface, wherein the pixel of the two overlapping pixels having the higher resolution value is included in the combined image projection, and wherein the pixels representing the projection surface are determined based on color information of the pixels.

15. A camera system for generating a combined image projection, comprising a first camera;

a second camera; and a control unit connected with the first and the second camera; wherein the control unit is configured to:

capture a first image of an object by a first camera;

capture a second image of the object by a second camera;

generate a first image projection of the first image;

generate a second image projection of the second image;

find an image content of the first and second image projection being contained in both image projections;

overlap the first and second image projections wherein the image content contained in both image projections matches together in an overlapped area;

determine a resolution value for each of two overlapping pixels of the overlapped area;

combine the first and the second image projection to a combined image projection;

determining a first distribution of resolution values of the first image projection within the overlapped area;

determining a second distribution of resolution values of the second image projection within the overlapped area; and comparing the first and the second distribution of resolution values, wherein the pixel of the two overlapping pixels having the higher resolution value is included in the combined image projection.

16. The camera system of claim 15, wherein the first camera comprises a fisheye lens or a rectilinear lens.

17. The camera system of claim 15, wherein the first camera and the second camera are of the same type.

18. The camera system of claim 15, wherein the first camera is relatively moveable in respect of the second camera.

19. The camera system of claim 15, comprising a reference marker.

\* \* \* \* \*